United States Patent [19]
Wu et al.

[11] Patent Number: 5,925,710
[45] Date of Patent: Jul. 20, 1999

[54] INFRARED ABSORBING POLYESTER PACKAGING POLYMER

[75] Inventors: Audrey C. Wu, Greenville; Gerald W. McNeely, Spartanburg, both of S.C.; Xiaoyan Huang, Charlotte, N.C.

[73] Assignee: Hoechst Celanese Corporation, Somerville, N.J.

[21] Appl. No.: 08/871,744

[22] Filed: Jun. 9, 1997

Related U.S. Application Data

[63] Continuation-in-part of application No. 08/839,005, Apr. 23, 1997, abandoned.

[51] Int. Cl.[6] .................................................. C08K 3/04
[52] U.S. Cl. ............................................. 524/495; 264/500
[58] Field of Search .............................. 524/495; 264/500

[56] References Cited

U.S. PATENT DOCUMENTS

| | | | |
|---|---|---|---|
| 4,408,004 | 10/1983 | Pengilly | 524/398 |
| 4,535,118 | 8/1985 | Pengilly | 524/398 |
| 4,762,749 | 8/1988 | Schuetz | 428/372 |
| 5,409,983 | 4/1995 | Jones et al. | 524/439 |
| 5,419,936 | 5/1995 | Tindale | 428/35.8 |
| 5,529,744 | 6/1996 | Tindale | 264/532 |

FOREIGN PATENT DOCUMENTS

0 739 933 A1   10/1996   European Pat. Off. .

*Primary Examiner*—Kriellion S. Morgan
*Attorney, Agent, or Firm*—Gregory N. Clements

[57] ABSTRACT

The present invention relates to a polyester polymer composition containing graphite in the range of about 3–60 parts per million based on the polyester. The size of the graphite particles is greater than about 0.5 μm. As an upper limit, however, any particle size which is not visible to the naked eye is acceptable. Such polyester polymers having graphite incorporated therein absorb infrared radiation better than polymers containing no graphite and thus in the production of plastic bottles less energy is required to heat the preform so that it can be blow molded into a bottle.

53 Claims, 4 Drawing Sheets

INFRARED ABSORBING POLYESTER PACKAGING POLYMER

BACKGROUND OF THE INVENTION

This application is a continuation-in-part of U.S. Ser. No. 08/839,005, filed Apr. 23, 1997, now abandoned.

FIELD OF THE INVENTION

The present invention relates to packaging polymers, particularly bottles made from packaging polymer compositions, and particularly polyester polymer compositions which have an improved infrared (IR) absorption characteristic. More specifically, the present invention relates to a polyester polymer composition that includes graphite as an infrared absorbing material. The present invention envisions the use of the polyester polymer compositions to make plastic bottles with acceptable color and clarity, and with good physical properties, and with improved infrared absorbing properties as the key characteristics.

PRIOR ART

The use of polyester compositions as a packaging material, particularly compositions comprising polyethylene terephthalate generally referred to as "PET" in the form of films, plastic bottles and other containers is well known. Plastic bottles are used in containing pressurized fluids, such as carbonated drinks, such as soft drinks or mineral waters, as well as in non-carbonated, non-pressurized drinks. To form plastic bottles, the polymer is extruded and then formed into chips. The chips are employed to make a bottle preform by injection molding as is well known in the industry. The preform is then reheated and blown into a mold which provides the final shape of the bottle. The blow molding step causes biaxial orientation of the polyester composition to occur at least in the side walls and the bottom of the bottles, and to a lesser degree in the neck. The biaxial orientation provides strength to the bottle so that it can resist deformation from internal pressure during use and adequately contain the fluid over an industry standardized shelf-life.

To summarize, a conventional polyester chip based on a modified PET resin is generally shipped to plastic bottle manufacturers who injection mold the polymer to make a bottle preform. The preform must be heated to about 105° C. and blow molded into a bottle shape. To reduce the energy required to heat the preform and to cause the preform to quickly achieve the desired blow molding temperature of about 105° C. would be particularly useful in the industry. Of course, the blow molding temperature varies for different polyester compositions, for example, polyethylene naphthalate would require a different blow molding temperature.

Heating a conventional polyester preform to about 105° C. is typically achieved with commercially available quartz infrared lamps which emit in the near infrared region (NIR) as well as in the infrared region (IR) as will be more clearly explained later. The absorption of infrared radiation by PET is low because PET tends to absorb infrared radiation only at certain frequencies as will be described later. Thus, the rate of heating PET is very dependent upon the ability of the polymer resin to absorb the infrared radiation and any components within the PET composition which can improve the absorption of infrared radiation is commercially useful for bottle manufacturers.

U.S. Pat. Nos. 5,409,983; 5,419,936 and 5,529,744 to Tindale and assigned to ICI disclose a polyester composition which includes an infrared radiation absorbing material comprising suitable metals which intrinsically absorb radiation in the wave-length region of 0.5 micron to 2 microns (NIR and IR) to substantially reduce the reheat time of the polymer or bottle preform. The suitable metals include antimony, tin, copper, silver, gold, arsenic, cadmium, mercury, lead, palladium, platinum or a mixture of two or more of these. For most applications, the metals silver, gold, arsenic, cadmium, mercury, lead, palladium, and platinum are either too expensive or environmentally hazardous and these metals are not particularly preferred. The more desired metals are one or more of antimony, tin or copper with antimony being particularly advantageous.

U.S. Pat. Nos. 4,408,004, and 4,535,118 to Pengilly and initially assigned to Goodyear disclose a polyester having improved infrared absorbing materials contained therein. The only infrared absorbing material mentioned is carbon black including specific types such as channel black and furnace black. The carbon black has an average particle size from 10 to 500 nanometers and a concentration from 0.1 to 10 parts by weight per million parts by weight of the polyester employed. This composition also substantially reduces the time to heat the preform to approximately 105° C.

European Patent Application EPA 739,933 in the name of Shimotsuma et al. and assigned to Teijin Limited discloses a polyester resin composition which contains, as a laser sensitive material, graphite having an average particle size of 0.1 to 50 microns. This patent does not recognize that graphite is useful for absorbing infrared radiation. This patent also is not related to bottle preforms, packaging materials, or plastic bottles. In fact, this patent relates to a printing technique for electric or electronic parts.

SUMMARY OF THE INVENTION

The present invention, in the broadest sense, includes a polyester resin containing graphite, the size of the graphite particles are such that they are not readily visible to the naked eye when uniformly dispersed in the resin and are present in an amount from 3 to 60 parts by weight per million parts by weight of the polyester resin (ppm).

In the broadest sense, the present invention includes a method of heating either a polyester resin or a polyester bottle preform by: exposing the polyester resin or polyester bottle preform to infrared radiation for a sufficient time to heat the polyester resin or polyester bottle preform to greater than ambient temperature, wherein the polyester resin or polyester bottle preform contains 3–60 ppm graphite particles, the graphite particles being not readily visible to the naked eye when uniformly dispersed therein.

In the broadest sense the present invention also comprises a bottle preform which can be heated with IR heaters to the desired blow molding temperature, and blow molded in the form of a plastic bottle, said bottle preform being made from polyester that contains graphite particles, with the size of the graphite particles being sufficiently small such that they are not readily visible to the naked eye when uniformly dispersed within the bottle preform. The graphite particles are present in an amount from 3 to 60 ppm based upon the amount of polyester resin.

In the broadest sense, the present invention also comprises a plastic bottle made from polyester that contains graphite particles, said graphite particles being sufficiently small that they are not readily visible to the naked eye upon uniform distribution within the plastic bottle and are employed in an amount of 3 to 60 ppm based on the amount of polyester.

DESCRIPTION OF THE PREFERRED EMBODIMENTS

Infrared radiation covers wavelengths from 0.8 micron to 500 microns, and is generally divided into near infrared (NIR 0.8 to 2.5 microns), middle IR (2.5 to 50 microns) and far IR (50 microns–500 microns). Heating occurs because the infrared radiation penetrates into the interior of the polymer and vibrates the molecules without subjecting the polymer to heating by conduction.

Figure 1:
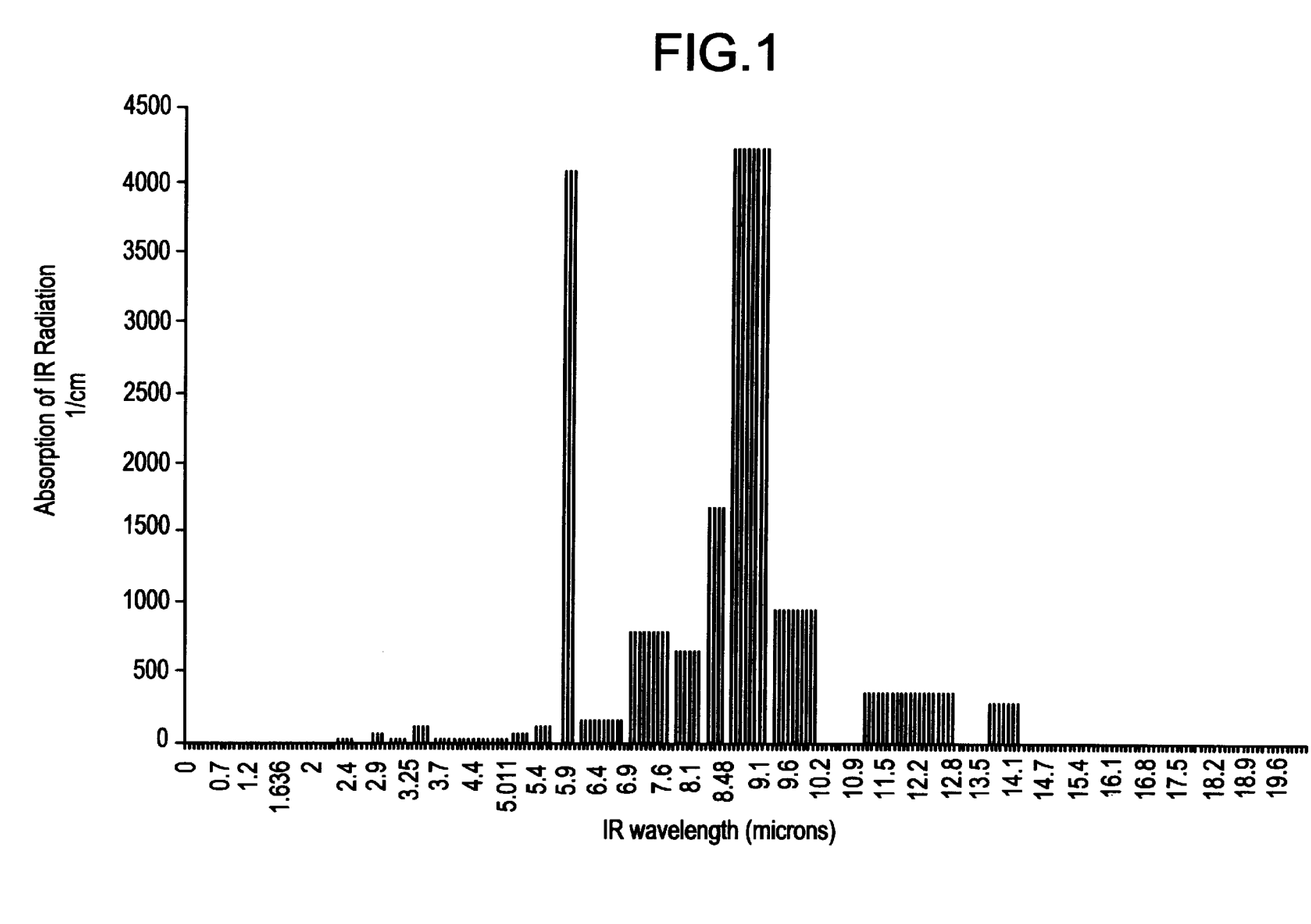
FIG. 1 is a chart of the PET Absorption Spectrum where IR wavelengths are plotted against the absorption coefficient (1/cm) of PET.

Polyester, and particularly polyethylene terephthalate (PET) can be heated by infrared radiation generally faster and more uniformly than by conduction heating, but PET absorbs only a small portion of the IR wavelength. As shown in FIG. 1, which is a plot of the absorption coefficient (1 over centimeter, which is the depth of penetration of the IR radiation) vs. IR wavelength, (in microns) it is clear that PET primarily absorbs the IR wavelengths around 5.9 and about 8.7 to 9.1. These correspond to specific bonds in the polyester which are excited by the infrared radiation. From FIG. 1 it is easy to visualize that if polyethylene terephthalate could be modified such that it could absorb more of the wavelengths of IR, it would require less time to be heated to approximately 105° C. in a preform and plastic bottle operation.

Of course, it is also necessary that the formed plastic bottle still exhibit good clarity. If the particles of the IR absorbing material, in the case of the present invention- graphite, are too large in size, then the particles scatter the visible light wavelengths and cause the bottle to appear hazy and not clear, particularly from an aesthetic viewpoint. If it is desired to make a plastic translucent bottle which is brown or green in color for certain specific types of soft drinks or alcoholic beverages such as beer, then the size and amount of the graphite particles is not so important. However, the industry does not want any particles to be seen with the naked eye even in translucent colored bottles. Nontranslucent colored bottles which are capable of masking the graphite particles can employ a broader size range of graphite, so long as the graphite does not appear on the surface of the bottle. Such bottles can achieve the primary goal of using less energy to heat the bottle preform for blow-molding.

Graphite, which is a crystalline allotropic form of carbon, most commonly exists in platelet form. For clear bottles, the graphite particles should be greater than about 0.5 $\mu$m (micron) in the largest dimension, and not readily visible to the naked eye(as an upper limit). A preferred range for graphite particle size is 0.6–8 $\mu$m.

The amount of graphite employed may range from 3 ppm up to 60 ppm based upon the weight of the resin. However, when a clear bottle is preferred, having approximately 40 ppm or more graphite (based on the weight of the resin) produces a bottle that is smoky gray to dark gray in color. While this may be acceptable for colored bottles, which the present invention is intended to cover, the preferred range of the present invention is between 5 and 20 ppm graphite, and more preferably between 8 and 12 ppm. If desired, master batches of the polymer composition or raw materials thereof containing quantities of the graphite in far higher concentrations can be made for subsequent blending with the polymer to achieve the desired levels of graphite in the polymer.

Suitable polyesters are produced from the reaction of a diacid or diester component comprising at least 65 mole % terephthalic acid or $C_1$–$C_4$ dialkylterephthalate, preferably at least 70 mole %, more preferably at least 75 mole %, even more preferably, at least 95 mole %, and a diol component comprising at least 65 mole % ethylene glycol, preferably at least 70 mole %, more preferably at least 75 mole %, even more preferably at least 95 mole %. It is also preferable that the diacid component is terephthalic acid and the diol component is ethylene glycol. The mole percentage for all of the diacid component totals 100 mole %, and the mole percentage for all of the diol component totals 100 mole %.

Where the polyester components are modified by one or more diol components other than ethylene glycol, suitable diol components of the described polyesters may be selected from 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis or trans configuration or as mixtures of both forms. Preferred modifying diol components are 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like. In the polymer preparation, it is often preferable to use a functional acid derivative thereof such as the dimethyl, diethyl, or dipropyl ester of the dicarboxylic acid. The anhydrides or acid halides of these acids also may be employed where practical. These acid modifiers generally retard the crystallization rate compared to terephthalic acid.

Also particularly contemplated by the present invention is a modified polyester made by reacting at least 85 mole % terephthalate from either terephthalic acid or dimethyl terephthalate with any of the above comonomers. The mole % of all diacids is 100 mole %, and the mole % of all diols is 100 mole %.

In addition to polyester made from terephthalic acid (or dimethyl terephthalate) and ethylene glycol, or a modified polyester as stated above, the present invention also includes the use of 100% of an aromatic diacid such as 2,6 naphthalene dicarboxylic acid or bibenzoic acid, or their diesters, and a modified polyester made by reacting at least 85 mole % of the dicarboxylate from these aromatic diacids/diesters with any of the above comonomers.

Conventional production of polyethylene terephthalate is well known in the art and comprises reacting terephthalic acid with ethylene glycol at a temperature of approximately 200 to 250° C. forming monomer and water. Because the reaction is reversible, the water is continuously removed, driving the reaction to the production of monomer. Next, the monomer undergoes a polycondensation reaction to form the polymer. During the reaction of the terephthalic acid and ethylene glycol it is not necessary to have a catalyst present. Generally, during the polycondensation reaction, a catalyst is preferred such as antimony. Using diesters, other diacids and other diols various catalysts may conventionally be employed as is well known in the art. The manner of producing the polyester of the present invention by any conventional manner is acceptable for the present invention.

In the making of bottle preforms and plastic bottles from the preforms, it is often desired to produce the cleanest clearest polymer. Accordingly, the less additives employed, the clearer the polymer produced. On the other hand, it is sometimes desirable to make a colored plastic bottle or bottles with other desired characteristics, and thus the use of a variety of conventionally known additives is also within the scope of the present invention. Accordingly, various pigments, dyes, fillers, branching agents, crystallization retarding agents, and other typical agents may be added to the polymer generally during or near the end of the polycondensation reaction. The exact desired additives and the place on introduction in the reaction does not form a part of this invention and this technology is well known in the art. Any conventional system maybe employed and those skilled in the art can pick and choose among the various systems of introduction of additives to achieve the desired result.

The graphite may be introduced into the polyester production process at any time. For example, if a diacid and a glycol are being reacted the graphite could be introduced during the esterification reaction or during the polycondensation reaction. Because graphite primarily exists in a platelet like structure, it naturally orients itself in the direction of injection molding for the bottle preforms and in the direction of blow molding during the production of plastic bottles. This means that the platelets align themselves with the walls of the preform or with the walls of the plastic bottle such that their major surface corresponds with the major surface of the bottle preform or plastic bottle. The advantage of such an alignment occurs when the bottle preform is subjected to infrared radiation. The radiation is absorbed better by the graphite which is oriented in a manner exposing its largest surface to the infrared radiation thereby capturing and absorbing radiation.

Figure 4:
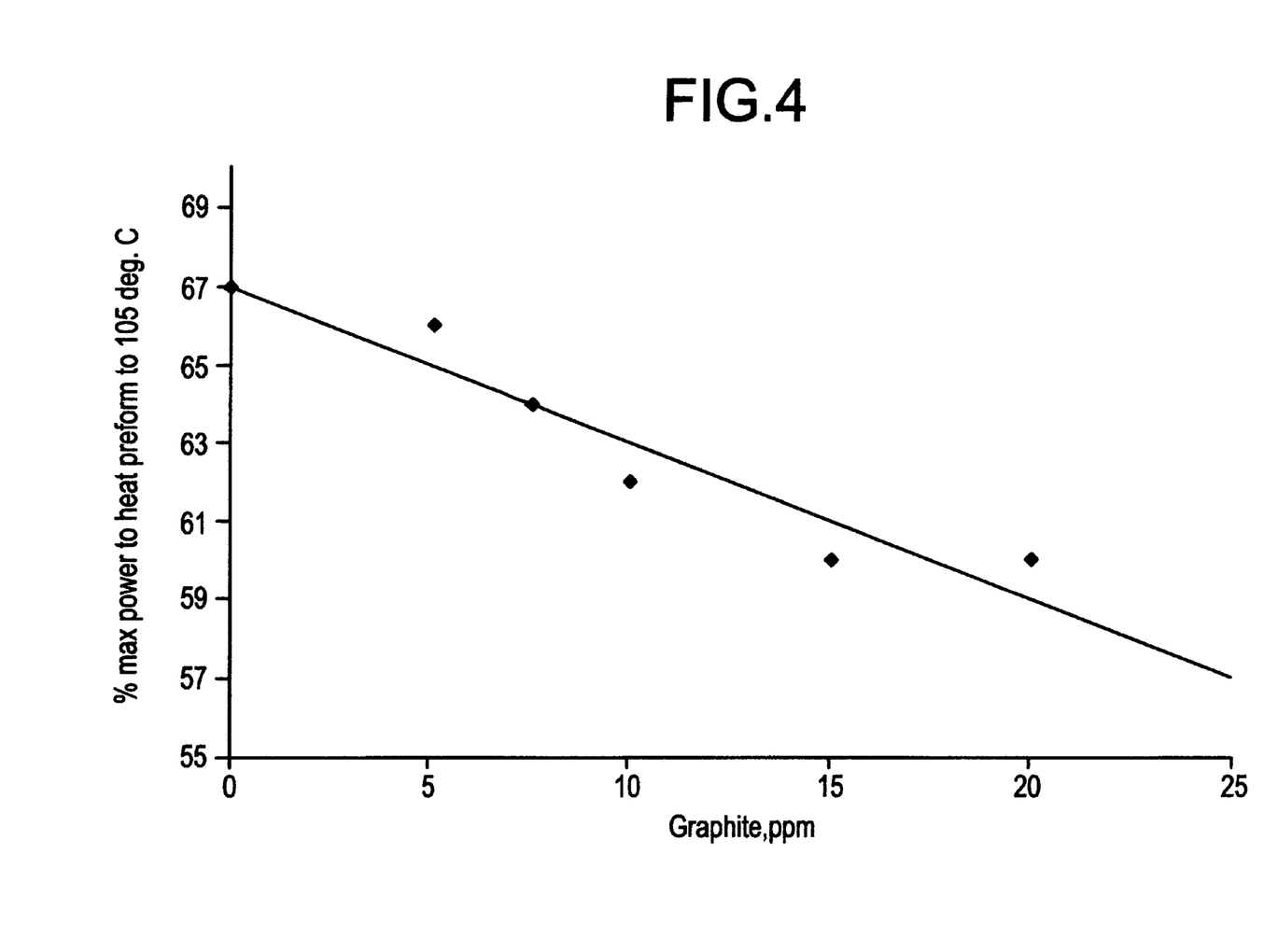
FIG. 4 is a graph of the percent maximum power to heat a bottle preform to 105° C. vs. the amount of graphite in the preform in ppm.

The amount of energy needed to reheat the preforms depends on the optimum temperature for stretch-blow molding of the bottle. If the temperature is too low, the bottle will have a pearlescence appearance, and if the temperature is too high, the bottle will have a hazy appearance. This temperature difference is called the blow-molding window. In commercial operations the energy of the IR heating lamps is set to heat the preforms to a temperature in the middle of the blow-molding window. FIG. 4 shows the energy required to heat the preforms containing graphite, in a Sidel SBO 2/3 production machine, to a temperature of 105° C., and illustrates the lower energy requirement as the graphite concentration increases.

Test Methods

The relative viscosity (RV) was determined by mixing 0.2 grams of the amorphous polymer composition with 20 milliliters of solvent consisting of dichoroacetic acid at a temperature of 25° C. and using a Ubbelohde viscometer to determine the viscosity.

The haze of the amorphous polymer composition was determined by visual observation.

Brightness and yellowness of the amorphous polymer composition were determined by using a digital color monitor such as Hunter Lab Scan 6000. Usually the range of acceptable brightness is 25–35. The lower the number the grayer the polymer. For yellowness, a negative number indicates more blueness and a positive number indicates more yellowness. Preferably the yellowness number is between −3 to −8 (not yellow, but not too blue).

Analysis of the DEG (diethylene glycol) content in the amorphous polymer resin was also determined. An appropriate portion of the amorphous polymer was hydrolyzed with an aqueous solution of ammonium hydroxide in a sealed reaction vessel at 220±5° C. for approximately two hours. The liquid portion of the hydrolyzed product is then analyzed by gas chromatography. The gas chromatography apparatus, was a FID Detector (HP5890, HP7673A) from Hewlett Packard. The ammonium hydroxide is 28 to 30% by weight ammonium hydroxide from Fisher Scientific and is reagent grade.

The CEG (carboxyl end groups) value of the amorphous polymer is determined by dissolving a sample of the amorphous polymer in reagent grade benzyl alcohol and titrated to the purple end point of phenol Red indicator with 0.03N sodium hydroxide/benzyl alcohol solution. The results are reported as milliequivelents sodium hydroxide per kilogram of the sample.

The analysis of acetaldehyde (A/A) in the amorphous polymer in parts per million is determined by obtaining a representative sample of the amorphous polymer, cryogenically grinding the polymer (using liquid nitrogen) such that the amorphous polymer passes through a number ten mesh sieve but collects on a 25 mesh sieve. A weighted portion is then heated at 160° C. for 90 min. in a closed system to release the acetaldehyde. The acetaldehyde content of the headspace in the closed system is then analyzed by gas chromatography and the parts per million acetaldehyde is determined therefrom. The gas chromatography apparatus employed is the same as that employed for the DEG analysis.

The determination of the amount of catalysts and the sequestering agent in the amorphous polymer is determined by employing a DC plasma emissions spectrograph. The spectrograph employed is manufactured by Spectrometric Inc. of Andover MA and is Model Spectraspan III high voltage DC Plasma Emission Spectrograph. A sample of the amorphous polymer is placed in a cassette and the cassette is introduced into the spectrograph and the based line and the slope of each catalyst and sequestering agent present is determined. The catalysts employed in the Example are antimony (Sb), manganese (Mn), and cobalt (Co) and the sequestering agent is phosphorous (P).

The glass transition temperature ($T_g$), the melt temperature ($T_m$) and the temperature of maximum crystallization rate ($T_c$) were also determined. A differential scanning calorimeter (DSC) is used to determine the temperature at the glass, crystallization rate, and melt point transition. The rate of temperature increase/decrease is 10° C. per minute. The DSC employed was a Model 910 DSC from Perkins Elmer. The DSC was purged with nitrogen at a rate of 50 ml per minute.

The percent isophthalic acid (IPA) present in the amorphous polymer was determined using a Hewlett Packard Liquid Chromotograph (HPLC) with an ultraviolet detector at 285 nanometers. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

The Example

The samples in the Example were produced in a 500 pound pilot line reactor. The polymer was prepared from 199 kilograms of DMT with 135 kilograms of ethylene glycol, and with 82 parts per million manganese (using manganese acetate), and 250 parts per million antimony (using antimony trioxide), and 65 parts per million cobalt (using cobalt acetate), and 1.4 weight % diethylene glycol(based on the weight of the polymer). Seven batches were prepared overall with 0, 5, 7.5, 10, 15, 20, and 50 parts by weight graphite per million parts by weight polymer. The maximum ester interchange batch temperature was 250° C. During the ester interchange reaction, the methanol was removed. At the start of the polycondensation reaction 69.7 parts by weight phosphorus per million parts by weight polymer was added in form of polyphosphoric acid as a sequestering agent to arrest the ester interchange catalytic activity. Additionally, 2.5 wt. % (based on the weight of the polymer) of isophthalic acid was employed, thus forming the copolyester polyethylene terephthalate isophthalate. The results of this Example are set forth in Table 1.

temperature of the preform (the variability of the infrared pyrometer is about 1° C.). The blow molding window of the resin was defined as the temperature range of the preforms that yielded a slightly pearlescent to a slightly hazy bottle. Using the control polymer's optimized blow molding conditions, heat scans were then performed on the other resins.

The control and the 5 ppm, 7.5 ppm, 10 ppm, 15 ppm and 20 ppm graphite polymer samples were injection molded into bottle preforms and blown into plastic bottles.

Figure 2:
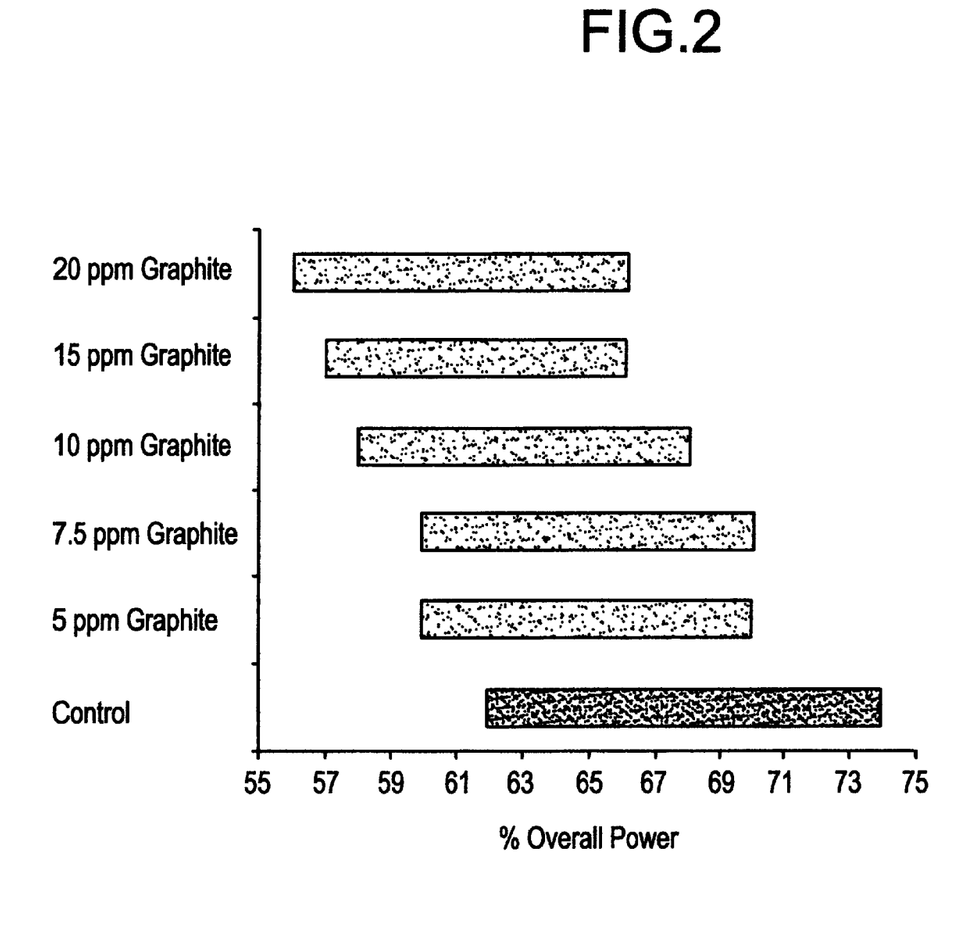
FIG. 2 is a bar graph of Percent Overall Power at Blow Molding Window where the % overall power of IR lamps is plotted against the control and 5 ppm, 7.5 ppm, 10 ppm, 15 ppm and 20 ppm graphite/polymer compositions.

FIG. 2 shows the percentage of overall power employed by the infrared lamps necessary to heat the samples, namely: the control having no graphite, and the 5 ppm, 7.5 ppm, 10 ppm, 15 ppm and 20 ppm graphite samples. This Figure clearly shows that less power is used by the IR lamps (in the Sidel SBO 2/3 machine) to heat the polymer to a temperature such that it can be blow molded into an acceptable plastic bottle (approximately 105° C.) when graphite is employed.

Figure 3:
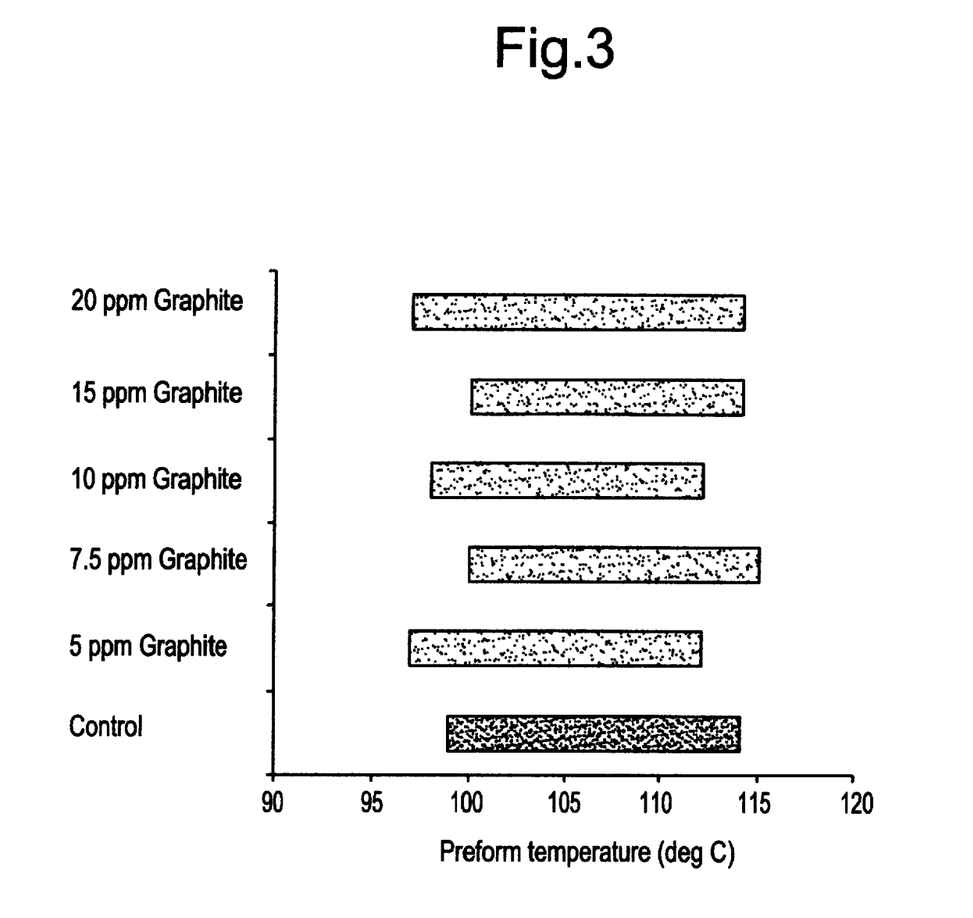
FIG. 3 is a bar graph of the Blow Molding Window where the preform temperature (in °C.) is plotted against the control and 5 ppm, 7.5 ppm, 10 ppm, 15 ppm and 20 ppm graphite/polymer compositions.

FIG. 3 shows the blow molding window for the bottle preforms (set forth in FIG. 2) versus the preform temperature (in °C.). The blow molding window is the temperature range where the preform can be blow molded into a plastic bottle. If the temperature is too cool (generally below approximately 100° C.) blow molding will cause cold stretching of the polymer, creating a whitish color in the bottle referred to as pearlesence. Obviously stretching at too cold of a temperature is not desired as it affects the physical properties, the ability of the bottle to properly conform to the shape of the mold when being blown, and the overall appearance of the bottle. On the other hand, if the temperature is too hot the bottle develops haziness and is no longer

TABLE 1

| TYPE | AMORPHOUS POLYMER | | | DEG % | CEG | A/A ppm | Sb ppm | Mn ppm | Co ppm | P ppm | Tg | Tc | Tm | IPA % |
| | RV | Yellowness | Brightness | | | | | | | | | | | |
| --- | --- | --- | --- | --- | --- | --- | --- | --- | --- | --- | --- | --- | --- | --- |
| Control GRAPHITE | 1.887 | −7.1 | 31 | 1.51 | 22 | 73 | 216 | 75 | 64 | 67 | 78.4 | 168 | 245.3 | 2.29 |
| Graphite-5 | 1.871 | −5.3 | 26.3 | 1.55 | 20 | 104 | 196 | 79 | 60 | 60 | 79.1 | 158.4 | 246 | 2.3 |
| Graphite-7.5 | 1.893 | −6.9 | 25 | 1.59 | 23 | 112 | 197 | 78 | 62 | 69 | 79.3 | 156.9 | 246.1 | 2.32 |
| Graphite-10 | 1.887 | −5.8 | 24.8 | 1.68 | 22 | 73 | 214 | 76 | 68 | 70 | 78.8 | 166 | 245.4 | 2.34 |
| Graphite-15 | 1.892 | −6 | 24.1 | 1.54 | 23 | 83 | 202 | 76 | 63 | 72 | 78.8 | 162.6 | 245.7 | 2.31 |
| Graphite-20 | 1.900 | −6.7 | 21.1 | 1.56 | 21 | 68 | 224 | 74 | 65 | 69 | 78.8 | 164.6 | 245.1 | 2.41 |
| Graphite-50 | 1.892 | −4.6 | 16.3 | 1.7 | 23 | 64 | 198 | 76 | 56 | 66 | 78.2 | 163.5 | 245.1 | 2.36 |

Table 1 shows that the various graphite samples (except for the 50 ppm sample) have substantially the same features and properties as the control. The 50 ppm sample actually had the best (lowest) acetaldehyde level, but brightness properties were not satisfactory for making clear bottles. Green or brown colored plastic bottles may be produced with a 50 ppm graphite polymer.

The blow molding windows and preform reheat properties of the PET control & PET containing 5, 7.5, 10, 15 and 20 ppm of graphite were analyzed at Plastic Technologies, Inc. (Holland, Ohio). The bottles were blown on a Sidel SBO 2/3 production machine using a single 2-liter generic carbonated soft drink bottle mold. First, the blow molding conditions were optimized for an appropriate control resin. A "heat scan" was then performed on the control resin by lowering and raising the percent overall power of the quartz oven lamps in 2% increments. Ten bottles were blown at each percent overall power and one of the middle bottles was observed for amount of pearlescence or haze. The preform temperature at the oven outlet of the SBO machine was recorded using an infrared pyrometer that reads the surface transparent. For nontransparent colored bottles, for example, slight haziness would be masked by the pigment.

Thus it is apparent that there has been provided, in accordance with the invention, a product and process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A polyester composition useful for absorbing IR radiation, comprising: a polyester containing about 3–60 parts by weight graphite particles per million parts by weight of said polyester, wherein said graphite particles when uniformly dispersed in said polyester are not readily visible to the naked eye.

2. The polyester composition of claim 1, wherein said graphite particles are greater than 0.5 µm in the largest dimension.

3. The polyester composition of claim 1, wherein said polyester contains at least 85 mole % terephthalate.

4. The polyester composition of claim 1, wherein said polyester contains at least 85 mole % naphthalate.

5. A polyester bottle preform for making plastic bottles wherein said bottle preform absorbs IR radiation, said preform made from a polyester containing about 3–60 parts by weight graphite particles per million parts by weight of said polyester, wherein said graphite particles when uniformly dispersed in said preform are not readily visible to the naked eye.

6. The polyester bottle preform of claim 5, wherein said graphite particles are greater than about 0.5 $\mu$m in the largest dimension.

7. The polyester bottle preform of claim 5, wherein said polyester contains at least 85 mole % terephthalate.

8. The polyester bottle preform of claim 5, wherein said polyester contains at least 85 mole % naphthalate.

9. A plastic bottle capable of absorbing IR radiation, said bottle made from a polyester and about 3–60 parts by weight graphite particles per million parts by weights of said polyester, wherein said graphite particles are not readily visible to the naked eye.

10. The plastic bottle of claim 9, wherein said polyester comprises contains at least 85 mole % terethphalate.

11. The plastic bottle of claim 9, wherein said graphite particles are greater than about 0.5 $\mu$m in the largest dimension.

12. The plastic bottle of claim 9, wherein said polyester polymer contains at least 85 mole % naphthalate.

13. A method of blow molding a bottle preform into a plastic bottle, said method comprising: heating said bottle preform using IR radiation to a sufficient temperature that it can be blow molded into an acceptable plastic bottle having no pearlescence and no heat induced crystallization; and blow molding said preform into said plastic bottle, wherein said bottle preform comprises a polymer and about 3–60 parts by weight graphite particles per million parts by weight of said polymer, said polymer containing at least about 80% by weight polyester polymer and wherein said graphite particles are not readily visible to the naked eye.

14. The method of claim 13, wherein said graphite particles are greater than 0.5 $\mu$m in the largest dimension.

15. The method of claim 13, wherein said polyester contains at least 85 mole % terephthalate.

16. The method of claim 13, wherein said polyester contains at least 85 mole % naphthalate.

17. A method of heating a polyester bottle preform which comprises: exposing said polyester bottle preform to infrared radiation for a sufficient time to heat said preform to greater than ambient temperature, said polyester preform containing about 3–60 parts by weight graphite particles per million parts by weight polyester, wherein said graphite particles are not readily visible to the naked eye.

18. A polyester composition according to claim 1 wherein the polyester is the product of reacting a diacid or diester component comprising at least 65 mole % terephthalic acid or $C_1$–$C_4$ dialkylterephthalate or at least 85 mole % bibenzoic or 2,6-naphthalene dicarboxylic acid or an ester thereof and a diol component comprising at least 65 mole % ethylene glycol.

19. A polyester composition according to claim 18 wherein the size of the graphite particles is in the range 0.6–8 $\mu$m.

20. A polyester composition according to claim 19 wherein the amount of graphite is in the range between 5 and 20 parts per million based on the weight of the polyester.

21. A polyester composition according to claim 1 wherein the size of the graphite particles is in the range 0.6–8 $\mu$m.

22. A polyester composition according to claim 21 wherein the amount of graphite is in the range between 5 and 20 parts per million based on the weight of the polyester.

23. A polyester composition according to claim 1 wherein the amount of graphite is in the range between 5 and 20 parts per million based on the weight of the polyester.

24. A polyester composition according to claim 1 which has been produced by introducing the graphite during the production of the polyester.

25. A polyester bottle preform according to claim 5 wherein the polyester is the product of reacting a diacid or diester component comprising at least 75 mole % terephthalic acid or $C_1$–$C_4$ dialkylterephthalate or at least 85 mole % bibenzoic or 2,6-naphthalene dicarboxylic acid or an ester thereof and a diol component comprising at least 75 mole % ethylene glycol.

26. A polyester bottle preform according to claim 25 wherein the size of the graphite particles is in the range 0.6–8 $\mu$m.

27. A polyester bottle preform according to claim 26 wherein the amount of graphite is in the range between 5 and 20 parts per million based on the weight of the polyester.

28. A polyester bottle preform according to claim 5 wherein the size of the graphite particles is in the range 0.6–8 $\mu$m.

29. A polyester bottle preform according to claim 28 wherein the amount of graphite is in the range between 5 and 20 parts per million based on the weight of the polyester.

30. A polyester bottle preform according to claim 6 wherein the amount of graphite is at least 3 but less than 40 parts per million based on the weight of the polyester.

31. A plastic bottle according to claim 9 wherein the polyester is the product of reacting a diacid or diester component comprising at least 75 mole % terephthalic acid or $C_1$–$C_4$ dialkylterephthalate or at least 85 mole % bibenzoic or 2,6-naphthalene dicarboxylic acid or an ester thereof and a diol component comprising at least 75 mole % ethylene glycol.

32. A plastic bottle according to claim 31 wherein the size of the graphite particles is in the range 0.6–8 $\mu$m.

33. A plastic bottle according to claim 32 wherein the amount of graphite is in the range between 5 and 20 parts per million based on the weight of the polyester.

34. A plastic bottle according to claim 9 wherein the size of the graphite particles is in the range 0.6–8 $\mu$m.

35. A plastic bottle according to claim 34 wherein the amount of graphite is in the range between 5 and 20 parts per million based on the weight of the polyester.

36. A plastic bottle according to claim 9 wherein the amount of graphite is at least 3 but less than 40 parts per million based on the weight of the polyester.

37. A method according to claim 13 wherein the polyester is the product of reacting a diacid or diester component comprising at least 65 mole % terephthalic acid or $C_1$–$C_4$ dialkylterephthalate or at least 85 mole % bibenzoic or 2,6-naphthalene dicarboxylic acid or an ester thereof and a diol component comprising at least 65 mole % ethylene glycol.

38. A method according to claim 37 wherein the size of the graphite particles is in the range 0.6–8 $\mu$m.

39. A method according to claim 38 wherein the bottle preform comprises an amount of graphite in the range between 5 and 20 parts per million.

40. A method according to claim 13 wherein the size of the graphite particles is in the range 0.6–8 $\mu$m.

41. A method according to claim 40 wherein the bottle preform comprises an amount of graphite in the range between 5 and 20 parts per million.

42. A method according to claim 13 wherein the bottle preform comprises an amount of graphite which is at least 3 but less than 40 parts per million.

43. A method according to claim 14 wherein the bottle preform comprises an amount of graphite which is at least 3 but less than 40 parts per million.

44. A method according to claim 13 which comprises using less energy to heat the bottle preform to said sufficient temperature by infrared radiation than would be required without the presence of the graphite particles.

45. A method according to claim 17 which further comprises blow molding the heated polyester bottle preform into a bottle.

46. A method according to claim 45 wherein the polyester is the product of reacting a diacid or diester component comprising at least 65 mole % terephthalic acid or $C_1$–$C_4$ dialkylterephthalate or at least 85 mole % bibenzoic or 2,6-naphthalene dicarboxylic acid or an ester thereof and a diol component comprising at least 65 mole % ethylene glycol.

47. A method according to claim 46 wherein the size of the graphite particles is in the range 0.6–8 $\mu$m.

48. A method according to claim 47 wherein the amount of graphite is in the range between 5 and 20 parts per million based on the weight of the polyester.

49. A method according to claim 45 wherein the size of the graphite particles is in the range 0.6–8 $\mu$m.

50. A method according to claim 49 wherein the amount of graphite is in the range between 5 and 20 parts per million based on the weight of the polyester.

51. A method according to claim 45 wherein the amount of graphite is at least 3 but less than 40 parts per million based on the weight of the polyester.

52. A method according to claim 51 wherein the graphite particles are greater than 0.5 $\mu$m in the largest dimension.

53. A method according to claim 45 which comprises using less energy to heat the bottle preform to said sufficient temperature by infrared radiation than would be required without the presence of the graphite particles.

* * * * *